(12) United States Patent
Lu

(10) Patent No.: US 7,516,053 B1
(45) Date of Patent: Apr. 7, 2009

(54) METHOD AND SYSTEM FOR SIMULATING FRACTURE PROPAGATION IN BRITTLE MATERIALS

(75) Inventor: Mu Lu, Livermore, CA (US)

(73) Assignee: Livermore Software Technology Corporation, Livermore, CA (US)

(*) Notice: Subject to any disclaimer, the term of this patent is extended or adjusted under 35 U.S.C. 154(b) by 504 days.

(21) Appl. No.: 11/364,647

(22) Filed: Feb. 27, 2006

(51) Int. Cl.
*G06F 7/64* (2006.01)
*G06F 17/13* (2006.01)

(52) U.S. Cl. .................................. 703/6; 703/1; 703/7

(58) Field of Classification Search ................ 703/6
See application file for complete search history.

(56) References Cited

OTHER PUBLICATIONS

Moody, Reedy, and Kent: "Physical Basis for Interfacial Traction-Separation Models", Nov. 2002. Sandia National Laboratories, unlimited release, pp. 11-13 and 66-75.*
Ivankovic, Pandya, and Williams: "Crack growth predictions in polyethylene using measured traction-separation curves", Mar. 25, 2003. Engineering Fracture Mechanics, vol. 71, Issues 4-6, pp. 657-668.*
Bergkvist and Geux: "Curved crack propagation", Oct. 1979. International Journal of Fracture, vol. 15, No. 5, pp. 429-441.*
Moody et al., "Physical Basis for Interfracial Traction-Separation Methods", SANDIA Report 'SAND2002-8567 Unlimited Release Printed Nov. 2002'.*

* cited by examiner

*Primary Examiner*—Paul L Rodriguez
*Assistant Examiner*—Erick A Butzlaff
(74) *Attorney, Agent, or Firm*—Roger H. Chu (57) ABSTRACT

A system, method and software product for simulating fracture propagation in brittle materials is disclosed. Using the fracture energy release rates and the critical separations of the three fundamental fracture modes obtained independently from experiments, and a user defined normalized curve representing the traction-separation law, the present invention simulates the fracture propagation in a non-linear dynamic analysis. By using either dimensional or dimensionless effective separation approach, the actual tractions are calculated at each solution cycle based on user's choice. In addition, loading, unloading and reloading conditions are also continuously traced to ensure the proper constitutive equations are used. Three fracture modes are seamlessly mixed and integrated.

21 Claims, 8 Drawing Sheets

Model I
100A

FIG. 1A

Model II
100B

FIG. 1B

Model III
100C

METHOD AND SYSTEM FOR SIMULATING FRACTURE PROPAGATION IN BRITTLE MATERIALS

BACKGROUND OF THE INVENTION

1. Field of the Invention

The present invention generally relates to a method, system and software product used in three-dimensional non-linear finite element analysis of a structure, more particularly to simulating fracture propagation in brittle materials.

2. Description of the Related Art

Finite element analysis (FEA) is a computerized method widely used in industry to model and solve engineering problems relating to complex systems such as three-dimensional non-linear structural design and analysis. FEA derives its name from the manner in which the geometry of the object under consideration is specified. With the advent of the modern digital computer, FEA has been implemented as FEA software. Basically, the FEA software is provided with a model of the geometric description and the associated material properties at certain points within the model. In this model, the geometry of the system under analysis is represented by solids, shells and beams of various sizes, which are called elements. The vertices of the elements are referred to as nodes. The model is comprised of a finite number of elements, which are assigned a material name to associate with material properties. The model thus represents the physical space occupied by the object under analysis along with its immediate surroundings. The FEA software then refers to a table in which the properties (e.g., stress-strain constitutive equation, Young's modulus, Poisson's ratio, thermo-conductivity) of each material type are tabulated. Additionally, the conditions at the boundary of the object (i.e., loadings, physical constraints, etc.) are specified. In this fashion a model of the object and its environment are created.

FEA is becoming increasingly popular with automobile manufacturers for optimizing both the aerodynamic performance and structural integrity of vehicles. Similarly, aircraft manufacturers rely on FEA to predict airplane performance long before the first prototype is built. Rational design of semiconductor electronic devices is possible with Finite Element Analysis of the electrodynamics, diffusion, and thermodynamics involved in this situation. FEA is utilized to characterize ocean currents and distribution of contaminants. FEA is being applied increasingly to analysis of the production and performance of such consumer goods as ovens, blenders, lighting facilities and many plastic products. In fact, FEA has been employed in as many diverse fields as can be brought to mind, including plastics mold design, modeling of nuclear reactors, analysis of the spot welding process, microwave antenna design, simulating of car crash and biomedical applications such as the design of prosthetic limbs. In short, FEA is utilized to expedite design, maximize productivity and efficiency, and optimize product performance in virtually every stratum of light and heavy industry. This often occurs long before the first prototype is ever developed.

On the most challenging FEA tasks is to simulate fracture (e.g., crack, micro-crack) propagation in brittle materials such as glasses, ceramics, and hard composites. Fracture usually begins when stress applied to a material is concentrated at the tip of a micro-crack. When the stress exceeds a critical value, atomic bonds begin to break, elastic energy is released, and new surface is created as the crack propagates in the material. Brittle fracture is not only an annoying everyday experience or a safety hazard, but also an important technological process for the shaping of hard materials. Controlling the brittle fracture of flint-stone was the crucial step into the stone-age and polishing silicon wafers of 300 mm diameter with tolerable height variations of only a few atom spacing is a technological challenge today. Engineers at the beginning of the last century started to investigate brittle fracture processes and soon realized that the mechanical stress in the solid is concentrated at the crack tip. This stress concentration increases with increasing sharpness of the crack. In a brittle material, the crack tip is atomically sharp and, therefore, the material must sustain very high stresses exceeding the nominal fracture strength of engineering materials.

Figure 1A:
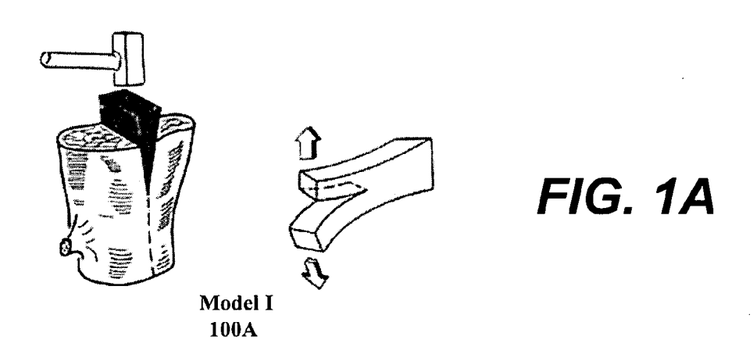
FIGS. 1A-1C depict three fundamental fracture modes.
Figure 1B:
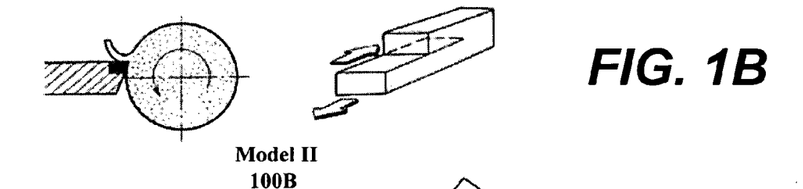
Figure 1C:
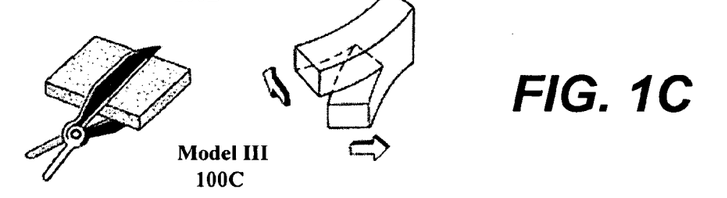

Fracture can be categorized into three fundamental modes: FIG. 1A shows an opening or normal mode which is designated as Mode-I 100A; FIG. 1B shows a forward shear or sliding mode designated as Mode-II 100B; and FIG. 1C shows a transverse shear or tearing mode designated as Mode-III 100C. These three fracture modes can occur separately or in any combination. Fractures in which two or more modes were operative are termed mixed-mode fractures. Today, all of the existing fracture propagation simulation schemes have problems. Some schemes require same fracture energy release rate for all three modes, some assume a simplified linear, bilinear or trilinear traction-separation law, some do not differentiate Mode-II and Mode-III, while others do not enforce the irreversible condition.

Therefore, there is a need to have a set of general cohesive laws that include all three fracture modes interacting with each other for simulating fracture in brittle material.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

The present invention discloses a system, method and software product for simulating fracture propagation in brittle materials. According to one aspect, fracture energy release rate and critical separation of each of the three fundamental modes is obtained and defined. A curve representing the normalized traction-separation law (TSL) is also defined. The area under the normalized TSL curve is calculated. The maximum traction for each of the modes is calculated using the fracture energy release rate and the critical separation of each individual mode. Depending upon which traction-separation law is selected, a set of constitutive equations for traction and separation is derived accordingly for loading and unloading conditions. The actual traction can be calculated at each solution cycle. The loading and the unloading condition are to be monitored and tracked in order to simulate the fracture propagation accurately.

In one embodiment, the present invention is a method for simulating fracture propagation in a brittle material of a structure, said method comprises: defining fracture energy release rate and critical separation of each of the three fracture modes; defining a normalized traction-separation curve; calculating the maximum traction for said each of the three fracture modes; selecting a fracture damage failure criterion; and calculating actual traction of said each of the three fracture modes based upon the criterion selected at each solution cycle.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will be better understood with regard to the following description, appended claims, and accompanying drawings as follows:

DETAILED DESCRIPTION OF THE PREFERRED EMBODIMENTS

The present invention discloses a system, method and software product for simulating fracture propagation in brittle material. According to one aspect, fracture energy release rate and critical separation of each of the three fundamental modes is obtained and defined. A curve representing normalized traction-separation law (TSL) is also defined. The area under the normalized TSL curve is calculated. The maximum traction for each of the modes is calculated using the fracture energy release rate and the critical separation of each individual mode. Depending upon which traction-separation law is selected, a set of constitutive equations for traction and separation is derived accordingly for loading and unloading conditions. The actual traction can be calculated at each solution cycle. The loading and unloading condition are monitored and tracked in order to simulate the fracture propagation accurately.

In the following description, numerous specific details are set forth in order to provide a thorough understanding of the present invention. However, it will become obvious to those skilled in the art that the present invention may be practiced without these specific details. The descriptions and representations herein are the common means used by those experienced or skilled in the art to most effectively convey the substance of their work to others skilled in the art. In other instances, well-known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

To facilitate the description of the present invention, it deems necessary to provide definitions for some terms that will be used throughout the disclosure herein. It should be noted that the definitions following are to facilitate the understanding and describe the present invention according to an embodiment. The definitions may appear to include some limitations with respect to the embodiment, the actual meaning of the terms has applicability well beyond such embodiment, which can be appreciated by those skilled in the art.

FEA stands for Finite Element Analysis.

Implicit FEA refers to $Ku=F$, where K is the effective stiffness matrix, u is the unknown displacement array and F is the effective loads array. F is a right hand side loads array while K is a left hand side stiffness matrix. The solution is performed at the global level with a factorization of the effective stiffness matrix, which is function of the stiffness, mass and damping. One exemplary solution method is the Newmark integration scheme.

Explicit FEA refers to $Ma=F$, where M is the diagonal mass array, 'a' is the unknown nodal acceleration array and F is the effective loads array. The solution can be carried out at element level without factorization of a matrix. One exemplary solution method is called the central difference method.

Time domain analysis refers to a FEA that simulates a physical phenomenon in time domain.

Dynamic analysis refers to a FEA that accounts for the mass and inertia effects of a structure. In general, there are two classes of dynamic analysis: time domain and frequency domain.

Solution cycle and cycle are used interchangeably to refer to the numbered solution states starting with cycle 0 at time 0.

The time step refers to an interval of time between consecutive solution cycles.

Total delamination, total debonding, or total decohesive refer to total damage or complete failure and are interchangeably used in this document.

Damage onset refers to the initiation of damage.

Separation and jump, used interchangeably, refer to the relative displacement between two cohesive points. At the critical separation, the material is in a state of total damage or complete failure, and fracture has occurred.

Embodiments of the present invention are discussed herein with reference to FIGS. 2-6. However, those skilled in the art will readily appreciate that the detailed description given herein with respect to these figures is for explanatory purposes as the invention extends beyond these limited embodiments.

Figure 2:
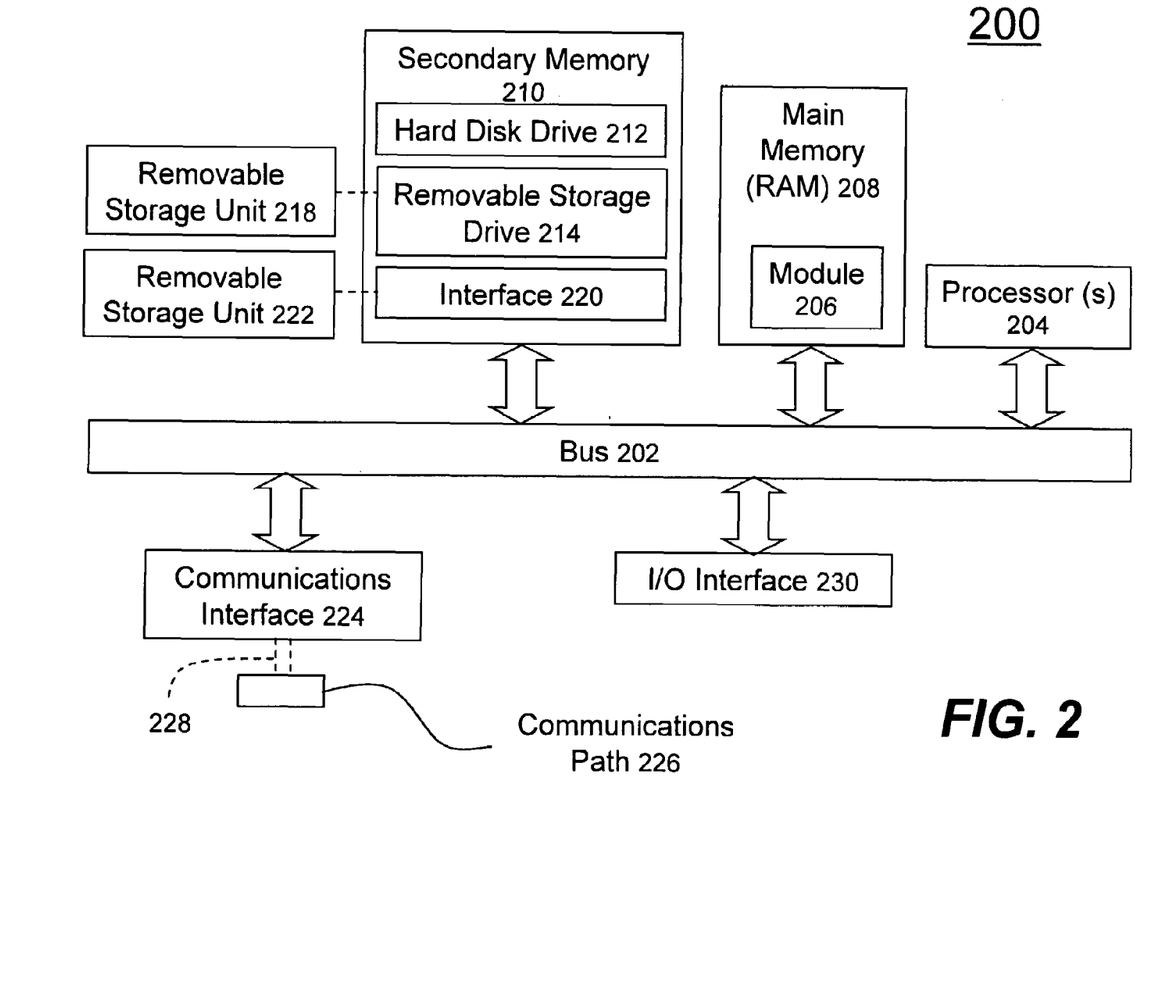
FIG. 2 depicts a block diagram of an exemplary computer, in which one embodiment of the present invention may be implemented.

Referring to the drawings, in which like numerals refer to like parts throughout several views. The present invention may be implemented using hardware, software or a combination thereof and may be implemented in a computer system or other processing system. In fact, in one embodiment, the invention is directed towards one or more computer systems capable of carrying out the functionality described herein. An example of a computer system 200 is shown in FIG. 2. The computer system 200 includes one or more processors, such as processor 204. The processor 204 is connected to a computer system internal communication bus 202. Various software embodiments are described in terms of this exemplary computer system. After reading this description, it will become apparent to a person skilled in the relevant art(s) how to implement the invention using other computer systems and/or computer architectures.

Computer system 200 also includes a main memory 208, preferably random access memory (RAM), and may also include a secondary memory 210. The secondary memory 210 may include, for example, one or more hard disk drives 212 and/or one or more removable storage drives 214, representing a floppy disk drive, a magnetic tape drive, an optical disk drive, etc. The removable storage drive 214 reads from and/or writes to a removable storage unit 218 in a well-known manner. Removable storage unit 218, represents a floppy disk, magnetic tape, optical disk, etc. which is read by and written to by removable storage drive 214. As will be appreciated, the removable storage unit 218 includes a computer usable storage medium having stored therein computer software and/or data.

In alternative embodiments, secondary memory 210 may include other similar means for allowing computer programs or other instructions to be loaded into computer system 200. Such means may include, for example, a removable storage unit 222 and an interface 220. Examples of such may include a program cartridge and cartridge interface (such as that found in video game devices), a removable memory chip (such as an EPROM, or PROM) and associated socket, and other removable storage units 222 and interfaces 220 which allow software and data to be transferred from the removable storage unit 222 to computer system 200. In general, Computer system 200 is controlled and coordinated by operating system (OS) software, which performs tasks such as process scheduling, memory management, networking and I/O services. Exemplary OS includes Linux®, Microsoft Windows®.

There may also be a communications interface 224 connecting to the bus 206. Communications interface 224 allows software and data to be transferred between computer system 200 and external devices. Examples of communications interface 224 may include a modem, a network interface (such as an Ethernet card), a communications port, a PCMCIA slot and card, etc. Software and data transferred via communications interface 224 are in the form of signals 228 which may be electronic, electromagnetic, optical, or other signals capable of being received by communications interface 224. These signals 228 are provided to communications interface 224 via a communications path (i.e., channel) 226. This channel 226 carries signals (or data flows) 228 and may be implemented using wire or cable, fiber optics, a phone line, a cellular phone link, an RF link and other communications channels.

The channel 226 facilitates a data flow 228 between a data network and the computer 200 and typically executes a special set of rules (i.e., a protocol) to send data back and forth. One of the common protocols is TCP/IP (Transmission Control Protocol/Internet Protocol) commonly used in the Internet. In general, the communication interface 224 manages the assembling of a data file into smaller packets that are transmitted over the data network or reassembles received packets into the original data file. In addition, the communication interface 224 handles the address part of each packet so that it gets to the right destination or intercepts packets destined for the computer 200.

In this document, the terms "computer program medium" and "computer usable medium" are used to generally refer to media such as removable storage drive 214, a hard disk installed in hard disk drive 212, and signals 228. These computer program products are means for providing software to computer system 200. The invention is directed to such computer program products.

The computer system 200 may also include an I/O interface 230, which provides the computer system 200 to access monitor, keyboard, mouse, printer, scanner, plotter, and a like.

Computer programs (also called computer control logic) are stored as applications modules 206 in main memory 208 and/or secondary memory 210. Computer programs may also be received via communications interface 224. Such computer programs, when executed, enable the computer system 200 to perform the features of the present invention as discussed herein. In particular, the computer programs, when executed, enable the processor 204 to perform the features of the present invention. Accordingly, such computer programs represent controllers of the computer system 200.

In an embodiment where the invention is implemented using software, the software may be stored in a computer program product and loaded into computer system 200 using removable storage drive 214, hard drive 212, or communications interface 224. The application module 206, when executed by the processor 204, causes the processor 204 to perform the functions of the invention as described herein.

In another embodiment, the present invention is implemented primarily in hardware using, for example, hardware components such as application specific integrated circuits (ASICs). Implementation of the hardware state machine so as to perform the functions described herein will be apparent to persons skilled in the relevant art(s). In yet another embodiment, the present invention is implemented using a combination of both hardware and software.

The main memory 208 may be loaded with one or more application modules 206 that can be executed by one or more processors 204 with or without a user input through the I/O interface 230 to achieve desired tasks. In operation, when at least one processor 204 executes one of the application modules 206, the results are computed and stored in the secondary memory 210 (i.e., the hard disk drive 212). In one embodiment, the results and/or pictures of fracture propagation simulation based upon the general cohesive material laws are reported to the user via the I/O interface 230 either as a list or a graph.

In one embodiment, an application module is configured to facilitate defining a normalized traction-separation curve and the fracture energy release rate and the critical separation for each of the three modes. Depending upon what traction-separation law is selected, the actual traction of three modes is calculated at each time cycle. Thereby the fracture propagation is simulated in a time domain. In another embodiment, an application module is configured to facilitate to track the separation parameter, either dimensional or dimensionless, to determine whether the fracture is under loading or unloading. If the former, the actual traction is calculated using the formula for loading condition. Otherwise, the formula for unloading condition is used. One exemplary implementation of this technique is included in a well-known engineering computer program product, LS-DYNA®, offered by Livermore Software Technology Corporation.

Figure 3A:
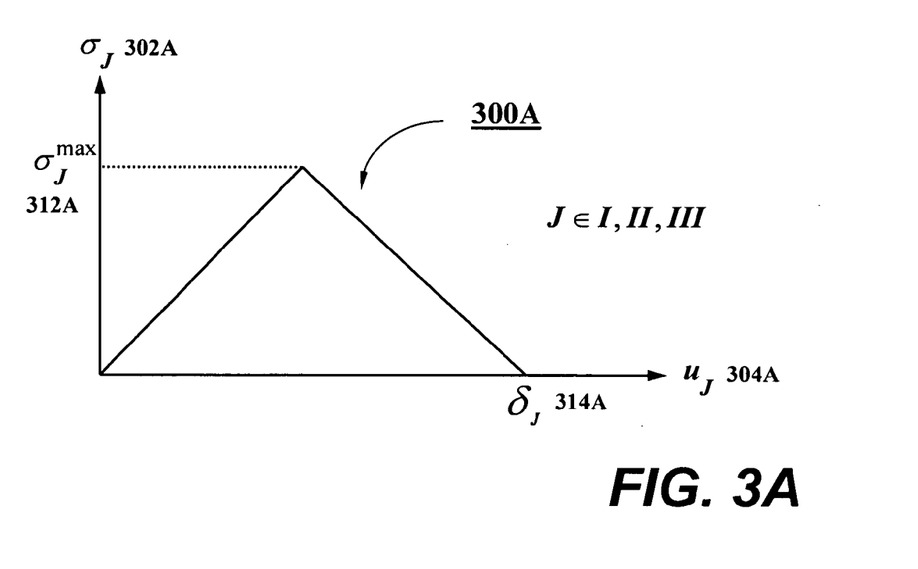
FIGS. 3A-3D shows a plurality of exemplary traction-separation curves in accordance with one embodiment of the present invention.
Figure 3B:
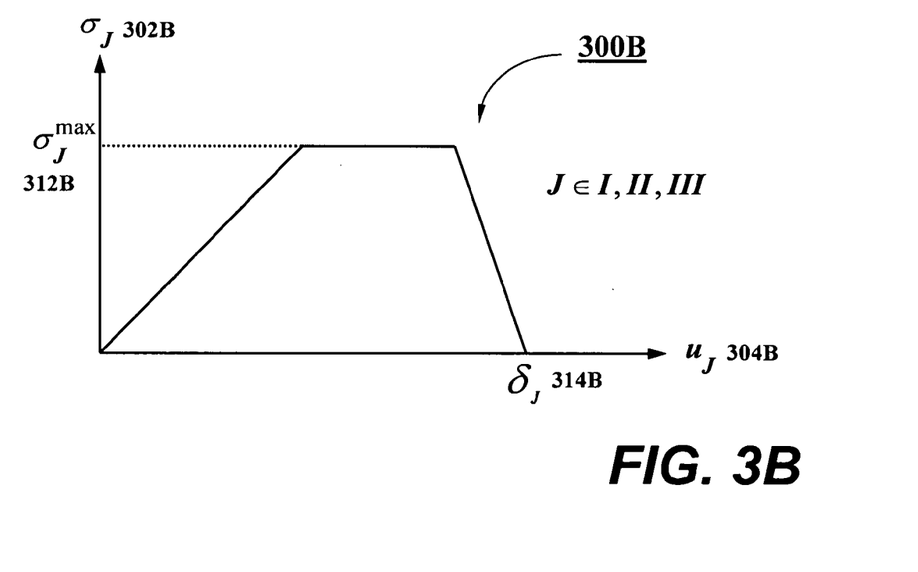
Figure 3C:
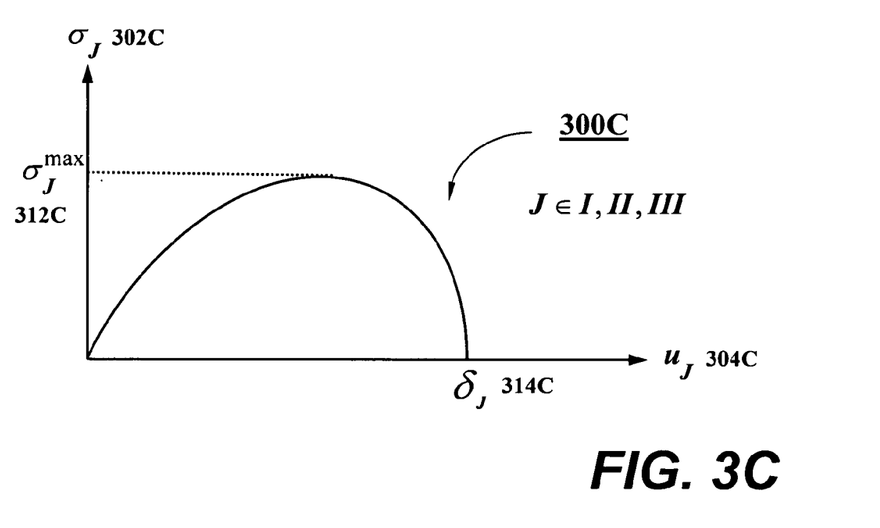
Figure 3D:
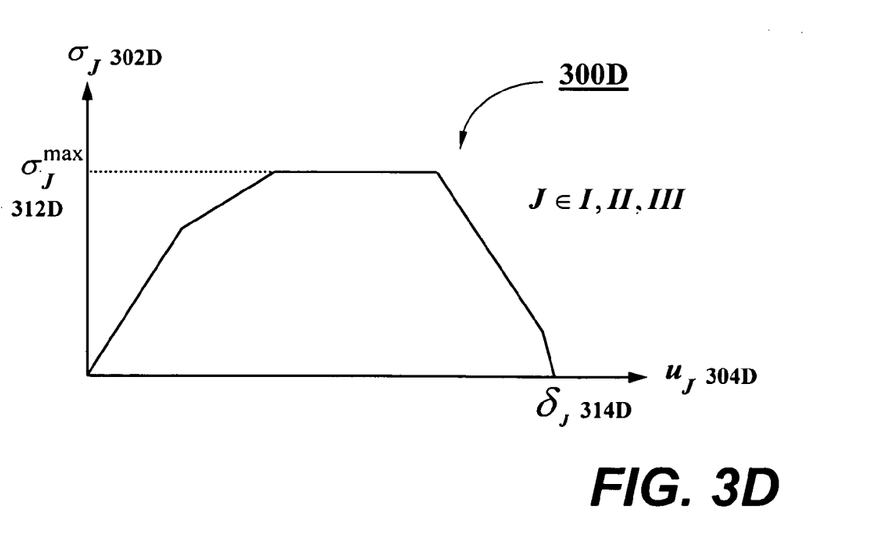

FIGS. 3A-3D show a plurality of exemplary traction-separation curves 300A-D in accordance with one embodiment of the present invention. In this embodiment, the traction $\sigma_J$ 302A plotted in the vertical axis represents the traction of stress or force in one of the fracture modes 100A-C. And the separation u, 304A-D plotted in the horizontal axis represents the separation or jump or relative displacement of that mode. All of the plurality of the curves show the characteristics of an elastic (i.e., reversible) ascending portion from an undeformed state of zero traction and separation (i.e., original state) to the peak traction $\sigma_J^{max}$ 312A-D and an inelastic irreversible descending portion from the peak traction to zero traction at the critical separation $\delta_J$ 314A-D. The point at the peak traction $\sigma_J^{max}$ 312A-D indicates the damage onset of a particular mode, and the point at the maximum separation indicates the total failure criterion for fracture propagation. FIG. 3A shows a bi-linear example 300A with an intersection at the peak traction $\sigma_J^{max}$ 312A. FIG. 3B shows a tri-linear example 300B with a horizontal platform at the level of the maximum traction $\sigma_J^{max}$ 312B. FIG. 3C shows a smooth curve example 300C with peak traction occurring at $\sigma_J^{max}$ 312C. FIG. 3D shows an example with multiple linear segments 300D with peak traction occurring at $\sigma_J^{max}$ 312D. The subscript J represents one of the three modes I, II and III.

Figure 4A:
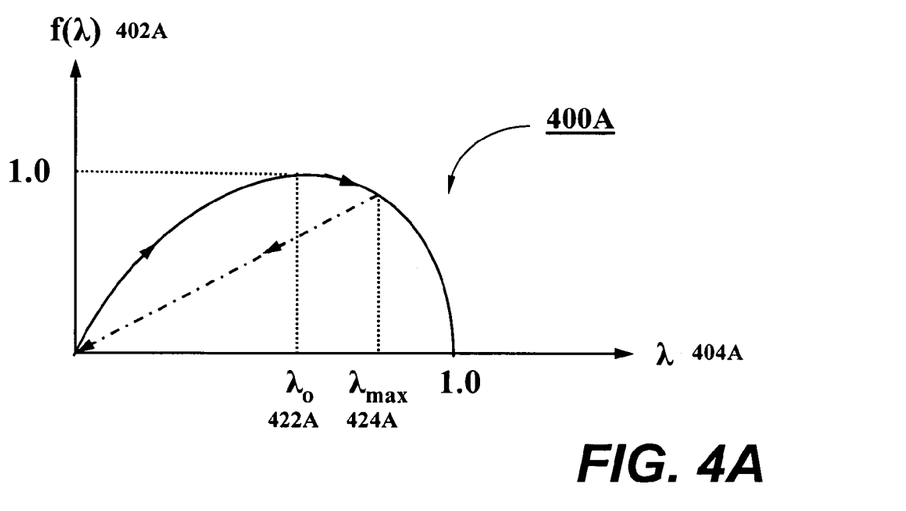
FIGS. 4A-4D show four exemplary normalized traction-separation curves in accordance with one embodiment of the present invention.
Figure 4B:
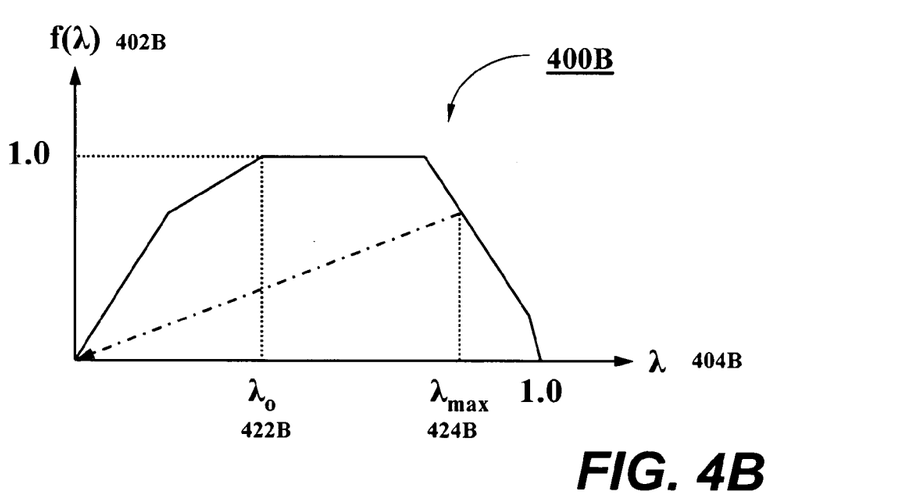

FIGS. 4A and 4B show a couple of exemplary normalized traction-separation curves 400A-B in accordance with one embodiment of the present invention. The dimensionless or normalized separations are defined as:

$$\lambda_J = \frac{u_J}{\delta_J} \quad J \in I, II, III \tag{1}$$

The horizontal axis represents normalized separation $\lambda_J$ 404A-B with value from 0 to 1; the vertical axis represents normalized traction $f(\lambda_J)$ 402A-B with $\max_\lambda f(\lambda_J)=1$.

In one embodiment using dimensionless effective separation parameter, a dimensionless effective separation parameter $\lambda$ (ESP) 404A-B is defined as follows:

$$\lambda = \sqrt{\lambda_I^2 + \lambda_{II}^2 + \lambda_{III}^2} = \sqrt{\left(\frac{u_I}{\delta_I}\right)^2 + \left(\frac{u_{II}}{\delta_{II}}\right)^2 + \left(\frac{u_{III}}{\delta_{III}}\right)^2} \tag{2}$$

where $u_I$, $u_{II}$, $u_{III}$ and $\delta_I$, $\delta_{II}$, $\delta_{III}$ are the separations at each solution cycle and critical separations of modes I 100A, II 100B and III 100C, respectively. ESP $\lambda=0$ represents materials in the original undeformed state and the complete failure or total damage of material occurs at ESP $\lambda=1$. ESP $\lambda$ 404A-B is computed and its historical maximum $\lambda_{max}$ 424A-B is recorded at each solution cycle to determine whether the material is under loading, unloading or reloading. Before ESP $\lambda$ 404A-B reaches $\lambda_0$ 422A-B, the material behavior is elastic and follows the elastic portion of the user defined curve for all conditions. Once ESP $\lambda$ 404A-B reaches $\lambda_0$ 422A-B, the damage onset starts. If ESP $\lambda=\lambda_{max}$ and $d\lambda/dt \geq 0$, the material is under loading condition, the material continues to follow the user defined curve. Otherwise, the material is under unloading condition. A cleavage unloading law is assumed for brittle materials, i.e., the unloading follows a secant slope from the state at $\lambda_{max}$ 424A-B to the original state. This implies an irreversible condition where the traction vanishes completely at the origin. At this stage, the material behavior follows the secant slope for both unloading and reloading. The fracture energy release rates or toughnesses, $G_I$, $G_{II}$, and $G_{III}$, the critical separations $\delta_I$, $\delta_{II}$, and $\delta_{III}$ (e.g., $\delta_J$ 314A-D), and the normalized traction-separation curve are obtained from experimental data and defined in the input deck by the user. The area $\Gamma$ under the normalized traction-separation curve is calculated as follows:

$$\Gamma = \int_0^1 f(\lambda) d\lambda \tag{3}$$

The maximum traction for each of the three modes is calculated as follows:

$$\sigma_I^{max} = \frac{G_I}{\Gamma \delta_I} \quad \sigma_{II}^{max} = \frac{G_{II}}{\Gamma \delta_{II}} \quad \sigma_{III}^{max} = \frac{G_{III}}{\Gamma \delta_{III}} \tag{4}$$

The ratios between fracture energy release rates are defined as follows:

$$\alpha_{II} \frac{G_{II}}{G_I} = \frac{\sigma_{II}^{max} \delta_{II}}{\sigma_I^{max} \delta_I} \quad \alpha_{III} \frac{G_{III}}{G_I} = \frac{\sigma_{III}^{max} \delta_{III}}{\sigma_I^{max} \delta_I} \tag{5}$$

The actual tractions of the three modes for loading case are calculated as follows:

$$\sigma_I = \begin{cases} \frac{f(\lambda)}{\lambda} \sigma_I^{max} \frac{u_I}{\delta_I} & \text{for } u_I \geq 0 \\ (1+p) k \sigma_I^{max} \frac{u_I}{\delta_I} & \text{for } u_I < 0 \end{cases} \tag{6}$$

$$\sigma_{II} = \frac{f(\lambda)}{\lambda} \sigma_{II}^{max} \frac{u_{II}}{\delta_{II}}$$

$$\sigma_{III} = \frac{f(\lambda)}{\lambda} \sigma_{III}^{max} \frac{u_{III}}{\delta_{III}}$$

where p is the penalty stiffness multiplier. The loading condition is determined when ESP 404A-B is increasing (i.e., $d\lambda/dt \geq 0$) and $\lambda=\lambda_{max}$, where $\lambda_{max}$ 424A-B is the maximum ESP during the time history up till now. The formulae for unloading case are as follows:

$$\sigma_I = k_I \frac{u_I}{\delta_I} \quad \sigma_{II} = k_{II} \frac{u_{II}}{\delta_{II}} \quad \sigma_{III} = k_{III} \frac{u_{III}}{\delta_{III}} \tag{7}$$

where $k_I$, $k_{II}$, $k_{III}$ are the secant slopes at $\lambda=\lambda_{max}$.

In the following embodiments, a plurality of exemplary functions $f(\lambda)$ is listed:

(1) Smith-Ferrante's universal binding law: $f(\lambda)=n\lambda e^{1-n\lambda}$, where n is chosen to satisfy $ne^{1-n} \leq \epsilon$.

(2) Cubic polynomial:

$$f(\lambda) = \frac{27}{4}\lambda(1-\lambda)^2$$

Figure 4C:
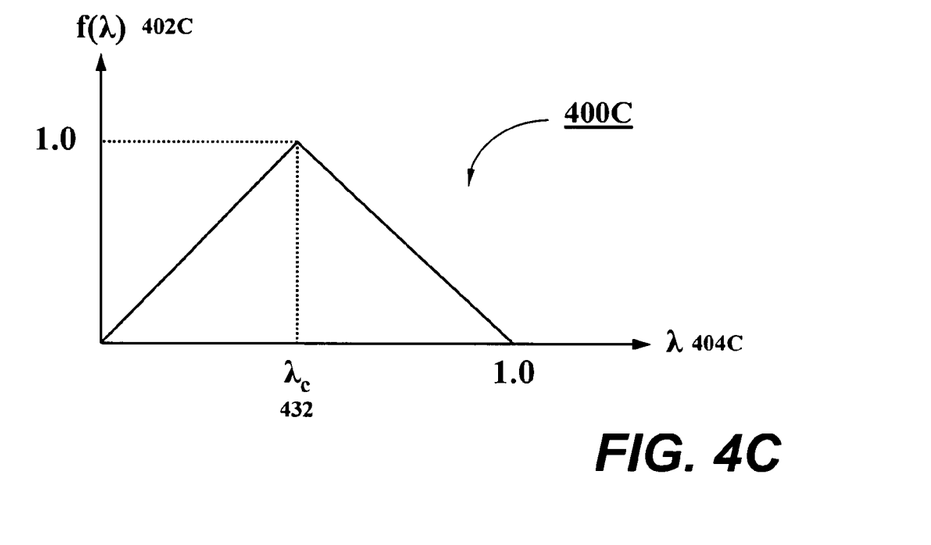

(3) Bi-linear (i.e., curve 400C shown in FIG. 4C):

$$f(\lambda) = \begin{cases} \frac{\lambda}{\lambda_c} & \text{if } 0 \leq \lambda \leq \lambda_c \\ \frac{1-\lambda}{1-\lambda_c} & \text{if } \lambda_c < \lambda \leq 1 \end{cases}$$

Figure 4D:
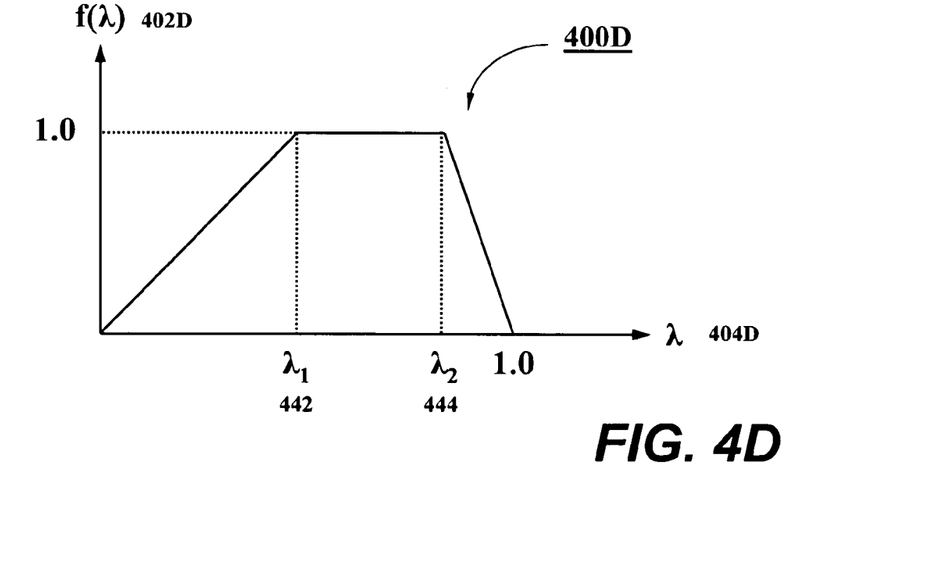

(4) Tri-linear (i.e., curve 400D shown in FIG. 4D):

$$f(\lambda) = \begin{cases} \frac{\lambda}{\lambda_1} & \text{if } 0 \le \lambda \le \lambda_1 \\ 1 & \text{if } \lambda_1 < \lambda \le \lambda_2 \\ \frac{1-\lambda}{1-\lambda_2} & \text{if } \lambda_2 < \lambda \le 1 \end{cases}$$

(5) Piecewise first order continuous (not shown):

$$f(\lambda) = \begin{cases} 2\left(\frac{\lambda}{\lambda_1}\right) - \left(\frac{\lambda}{\lambda_1}\right)^2 & \text{if } 0 \le \lambda \le \lambda_1 \\ 1 & \text{if } \lambda_1 < \lambda \le \lambda_2 \\ 2\left(\frac{1-\lambda_2}{1-\lambda_2}\right)^3 - 3\left(\frac{\lambda-\lambda_2}{1-\lambda_2}\right)^2 + 1 & \text{if } \lambda_2 < \lambda \le 1 \end{cases}$$

Figure 5A:
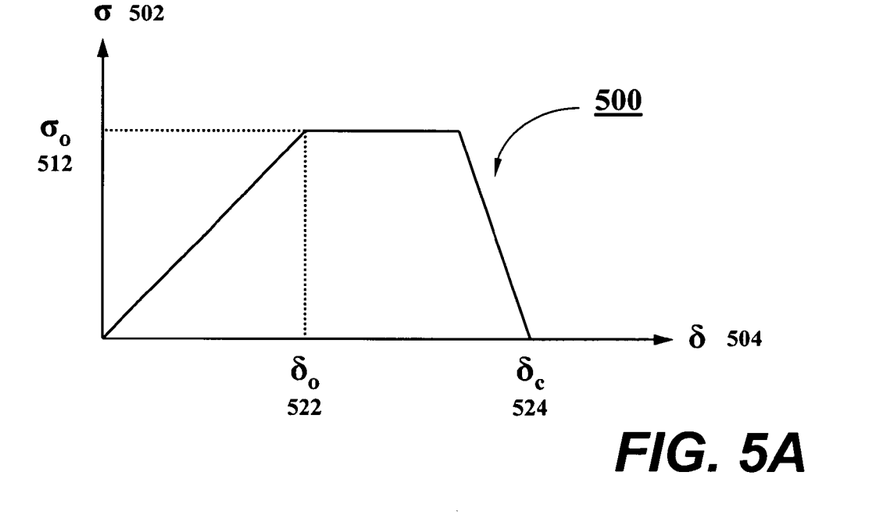
FIG. 5A shows an exemplary traction-separation curve used in the power law and the Benzeggagh-Kenane (B-K) law in accordance with one embodiment of the present invention.

For the embodiments using dimensional effective separation. FIG. 5A shows an exemplary traction-separation curve 500 used in the power law or the Benzeggagh-Kenane (B-K) law failure criterion in accordance with one embodiment of the present invention. In this embodiment, the vertical axis represents the effective traction σ 502 and the horizontal axis the effective separation δ 504. The separation $\delta_0$ 512 is the minimum separation that corresponds to the maximum effective traction $\sigma_0$ 522 and the total failure occurs at the critical separation $\delta_c$ 524. Although a tri-linear curve is shown in FIG. 5A, other type of curves may also be used.

Figure 5B:
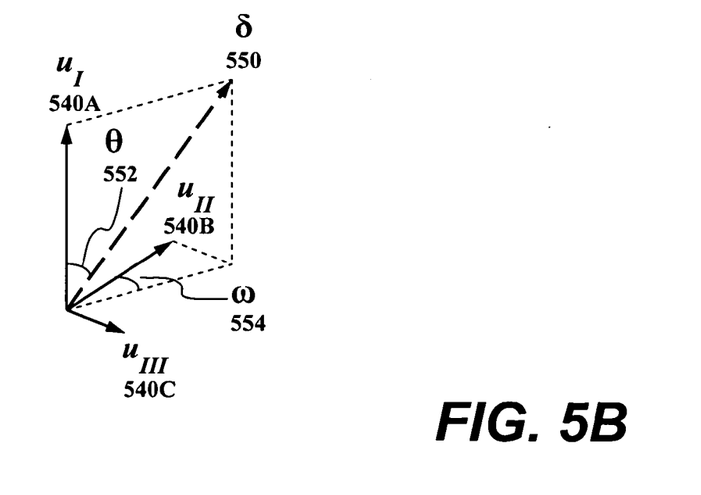
FIG. 5B shows the relationship between separations of the three modes and an effective opening separation in accordance with one embodiment of the present invention.

The effective opening separation is defined as the resultant separation δ 550 as shown in FIG. 5B. The actual separations $u_I$, $u_{II}$, $u_{III}$ 540A-C of the three fracture modes 100A-C are the components of the resultant separation at each solution cycle. Their relationship in a three-dimensional space is depicted in FIG. 5B and can be expressed physically by the following formulae:

$$\delta = \sqrt{\langle u_I \rangle^2 + u_{II}^2 + u_{III}^2} \quad \langle u_I \rangle = \delta\cos\theta \quad |u_{II}| = \delta\sin\theta\cos\omega$$
$$|u_{III}| = \delta\sin\theta\sin\omega \tag{8}$$

where ⟨•⟩ is the McCauley bracket defined as ⟨x⟩=max(0,x), θ 552 and ω 554 are angles defined in FIG. 5B, and δ 550 is total separation (i.e., resultant of the actual separations).

Before the onset of fracture damage, the tractions for the three fracture modes can be calculated as follows:

$$\sigma_I = \sigma_I^{max} f(\lambda_I) \quad \sigma_{II} = \sigma_{II}^{max} f(\lambda_{II}) \quad \sigma_{III} = \sigma_{III}^{max} f(\lambda_{III}) \tag{9}$$
$$\sigma_I = \sigma_I^{max} f\left(\frac{u_I}{\delta_I}\right) \quad \sigma_{II} = \sigma_{II}^{max} f\left(\frac{u_{II}}{\delta_{II}}\right) \quad \sigma_{III} = \sigma_{III}^{max} f\left(\frac{u_{III}}{\delta_{III}}\right)$$

The damage onset is predicted using a quadratic failure criterion as follows:

$$\left(\frac{\sigma_I}{\sigma_I^{max}}\right)^2 + \left(\frac{\sigma_{II}}{\sigma_{II}^{max}}\right)^2 + \left(\frac{\sigma_{III}}{\sigma_{III}^{max}}\right)^2 = 1 \tag{10}$$

which can be rewritten as an equation in terms of effective separation:

$$f^2\left(\frac{\delta\cos\theta}{\delta_I}\right) + f^2\left(\frac{\delta\sin\theta\cos\omega}{\delta_{II}}\right) + f^2\left(\frac{\delta\sin\theta\sin\omega}{\delta_{III}}\right) = 1 \tag{11}$$

The solution of the above equation $\delta_0$ falls in the interval $[0, \overline{\delta_0}]$ and is unique, where:

$$\overline{\delta_o} = \lambda_o \min\left(\frac{\delta_I}{\cos\theta}, \frac{\delta_{II}}{\sin\theta\cos\omega}, \frac{\delta_{III}}{\sin\theta\sin\omega}\right) \le \lambda_o \sqrt{\delta_I^2 + \delta_{II}^2 + \delta_{III}^2} \tag{12}$$

where $\lambda_o$ is the smallest value of $\lambda_J$ that corresponds to the peak value of $f(\lambda_J)$. The peak mixed-mode force can then be calculated accordingly.

Fracture propagation is predicted using either of the following failure criteria: a) the power law and b) the Benzeggagh-Kenane (B-K) law. In the former case, the criterion for predicting complete decohesion or total damage is expressed as follows:

$$\left(\frac{g_I}{G_I}\right)^m + \left(\frac{g_{II}}{G_{II}}\right)^m + \left(\frac{g_{III}}{G_{III}}\right)^m = 1 \tag{13}$$
$$\frac{g_I}{G_I} = \frac{1}{\Gamma} F\left(\frac{\delta\cos\theta}{\delta_I}\right)$$
$$\frac{g_{II}}{G_{II}} = \frac{1}{\Gamma} F\left(\frac{\delta\sin\theta\cos\omega}{\delta_{II}}\right)$$
$$\frac{g_{III}}{G_{III}} = \frac{1}{\Gamma} F\left(\frac{\delta\sin\theta\sin\omega}{\delta_{III}}\right)$$

where $$F(x) = \int_0^x f(\lambda_J) d\lambda_J.$$

A unique solution $\delta_c$ falls in the interval $[0, \overline{\delta_c}]$, where:

$$\overline{\delta_c} = \min\left(\frac{\delta_I}{\cos\theta}, \frac{\delta_{II}}{\sin\theta\cos\omega}, \frac{\delta_{III}}{\sin\theta\sin\omega}\right) \le \sqrt{\delta_I^2 + \delta_{II}^2 + \delta_{III}^2} \tag{14}$$

With the values of $\delta_0$ 522 and $\delta_c$ 524, the mixed-mode constitutive equation is formulated as:

$$\sigma_I = \sigma_I^{max} \frac{u_I}{\delta_I} \quad \sigma_{II} = \sigma_{II}^{max} \frac{u_{II}}{\delta_{II}} \quad \sigma_{III} = \sigma_{III}^{max} \frac{u_{III}}{\delta_{III}} \tag{15}$$

$$a = \begin{cases} \frac{\delta_c}{\delta} f\left(\frac{\lambda_o}{\delta_o}\delta\right) & \text{if } 0 \le \delta_{max} < \delta_o \\ \frac{\delta_c}{\delta_{max}} f\left(\frac{\delta_{max} - \delta_o}{\delta_c - \delta_o} + \lambda_o \frac{\delta_c - \delta_{max}}{\delta_c - \delta_o}\right) & \text{if } \delta_o \le \delta_{max} < \delta_c \\ 0 & \text{if } \delta_{max} \ge \delta_c \end{cases}$$

The above constitutive equation implies the following damage variable:

$$D = \begin{cases} 1 - \dfrac{1}{f(\lambda_o)} \dfrac{\delta_o}{\delta_{max}} f\left(\dfrac{\delta_{max} - \delta_o}{\delta_c - \delta_o} + \lambda_o \dfrac{\delta_c - \delta_{max}}{\delta_c - \delta_o}\right) & \text{if } \delta_o \leq \delta_{max} < \delta_c \\ 1 & \text{if } \delta_{max} \geq \delta_c \end{cases} \quad (16)$$

In the case of the B-K law, the constitutive equation is the same as that of the power law. The difference is that the value $\delta_c$ 524 is calculated from the following B-K failure criterion:

$$\delta_c = \delta_o + \dfrac{1-\lambda_o}{F(1) - F(\lambda_o)} \left(\dfrac{G_c}{\sigma_o} - \dfrac{F(\lambda_o)}{\lambda_o} \delta_o\right) \quad (17)$$

$$G_c = G_I + (G_{II} - G_I)\left(\dfrac{g_{II} + g_{III}}{g_I + g_{II} + g_{III}}\right)^m$$

where $g_I$, $g_{II}$, $g_{III}$ are calculated accumulatively at each solution cycle.

Figure 6:
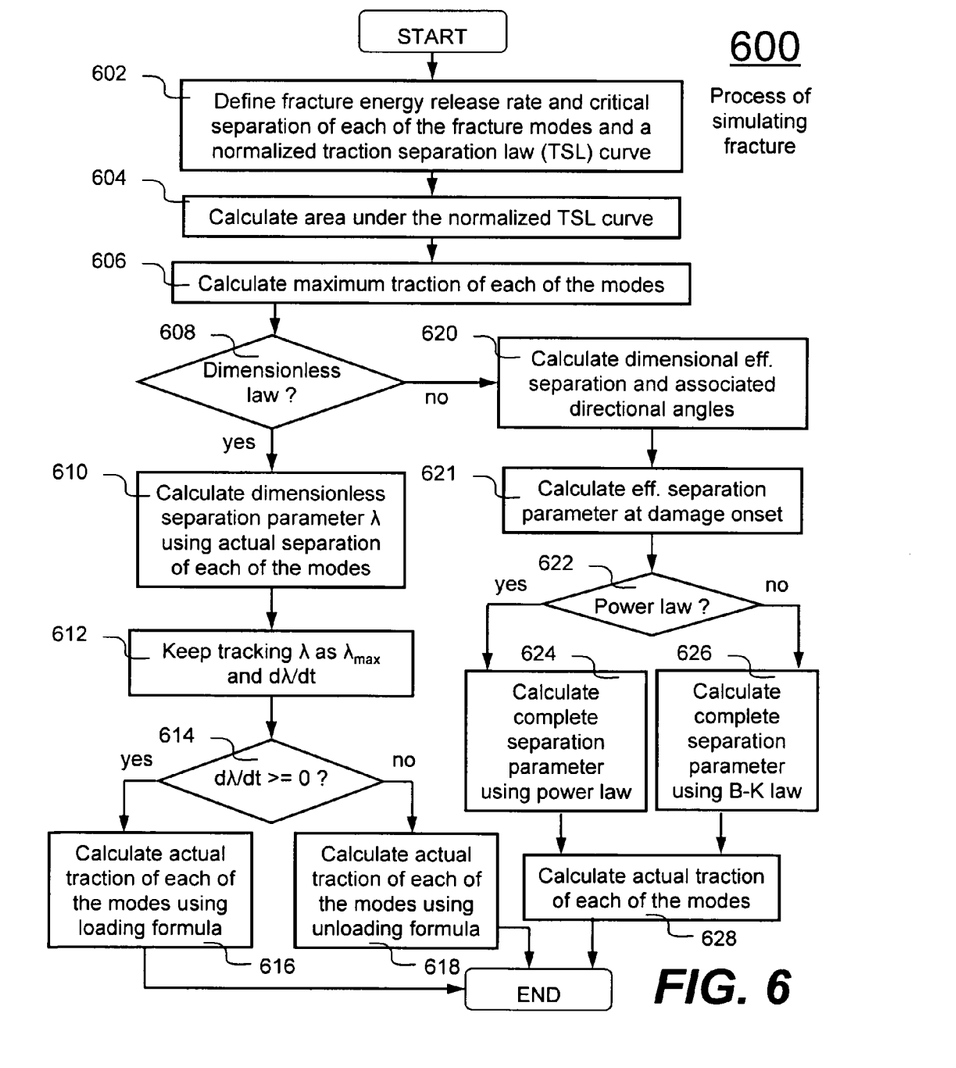
FIG. 6 shows a flowchart or process of simulating fracture propagation using general cohesive material laws in accordance with one embodiment of the present invention.

FIG. 6 shows a flowchart or process 600 of simulating fracture propagation using general cohesive material laws in accordance with one embodiment of the present invention. The process 600, which is preferably understood in conjunction with the previous figures, may be implemented in software, hardware, or a combination of both. In this embodiment, the process 600 starts by defining fracture energy release rates (i.e., toughnesses $G_I$, $G_{II}$, $G_{III}$) and the critical separation $\delta_I$, $\delta_{II}$, and $\delta_{III}$ of the three fracture modes 100A-C and a normalized traction-separation law (TSL) (e.g., FIGS. 4A-4D) at 602. The process 600 calculates the area $\Gamma$ under the normalized TSL curve at 604 using eq. (3). Then the maximum tractions $\sigma_I^{max}$, $\sigma_{II}^{max}$, $\sigma_{III}^{max}$ for each of the three modes are calculated at 606 using equation (4). The process 600 moves to a test 608, which determines whether the user has chosen to use the dimensionless traction-separation law. If the test 608 is true, the process 600 performs the following steps for calculating actual traction forces of each of the three modes. At 610, the process 600 calculates the dimensionless effective separation parameter $\lambda$ using eq. (2). It is noted that $\lambda$ is calculated at each solution cycle, since the actual separations can be constantly changing as time progresses. Next at 612, the process 600 keeps tracking the maximum value of $\lambda$ in order to determine whether the structure is undergoing loading or unloading at 614. When $\lambda$ is the historical maximum and $d\lambda/dt$ is greater than or equal to zero, then the test 614 is true. The process 600 follows the "yes" branch to 616, in which the actual tractions for each of the three modes are calculated using the loading case eq. (6) before the process 600 ends for a particular solution cycle. Otherwise if the test 614 is false, the process 600 calculates the actual tractions using the unloading case eq. (7) at 618 before ending.

Referring back to test 608, when the dimensional traction-separation law is chosen, the result of the test 608 is false. The process 600 follows the "no" branch to 620, in which a dimensional effective separation $\delta$ is calculated as the resultant of the actual separations $u_I$, $u_{II}$, $u_{III}$ of each of the three fracture modes using eq. (8). As a result, the relationship between the dimensional effective separation $\delta$ and the actual separations $u_I$, $u_{II}$, $u_{III}$ is also expressed in eq. (8). At 621, the process 600 calculates the effective separation at damage onset $\delta_0$ by solving eq. (10) or (11). It is noted that $\delta_0$ is solved every solution cycle to check the condition of damage onset. Then the process 600 moves to another test 622, in which the failure criterion is determined. There are two options for a user to choose: a) the power law and b) the B-K law. When the power law is chosen, the test 622 is true; the process 600 follows the "yes" branch to 624. The power law effective separation $\delta_c$ 524 at the complete failure (i.e., delamination, debonding, decohesive) is calculated in accordance with eq. (13). Otherwise, the process 600 goes to 626, in which the B-K law effective separation $\delta_c$ 524 is calculated using eq. (17). Finally at 628, the process 600 calculates the actual tractions $\sigma_I$, $\sigma_{II}$, $\sigma_{III}$ for each of the three modes using the values $\delta_0$ 522 and $\delta_c$ 524 in accordance with eq. (15) before ending at each solution cycle.

Although an exemplary embodiment of the invention has been disclosed, it will be apparent to those skilled in the art that various changes and modifications may be made to achieve the advantage of the invention. It will be obvious to those skilled in the art that some components may be substituted with another component providing the same function. The appended claims cover the present invention.

I claim:

1. A method of simulating fracture propagation in a brittle cohesive material, said method comprising:
   receiving, in a computing device with an application module for simulating fracture propagation in a brittle cohesive material installed thereon, three sets of a fracture energy release rate and a critical separation, each of the three sets corresponding to respective one of three fracture modes of the brittle cohesive material, wherein the three fracture modes comprise an opening mode, a sliding mode and a tearing mode, denoted by Mode-I, Mode-II and Mode-III, respectively;
   defining a normalized traction-separation curve for the brittle cohesive material;
   calculating three maximum tractions each for said respective one of the three fracture modes;
   selecting a fracture damage failure criterion;
   performing a time domain analysis of the fracture propagation in the brittle cohesive material, the time domain analysis comprising a plurality of solution cycles; and
   calculating, at each of the solution cycles, an actual traction of said each of the three fracture modes based upon the fracture damage failure criterion chosen, wherein the actual traction is used for determining fracture propagation at said each of the solution cycles such that the fracture propagation can be graphically displayed to a monitor coupled to the computing device.

2. The method of claim 1, wherein each of the three sets of the fracture energy release rate and the critical separation is obtained independently from separate experiment.

3. The method of claim 1, wherein each of the three sets of the critical separation is used for indicating a total damage in said each of the three fracture modes.

4. The method of claim 1, wherein each of the maximum tractions is calculated using the respective set of the three sets of the fracture energy release rate, the critical separation, and an area under a corresponding normalized traction-separation curve.

5. The method of claim 1, wherein the fracture damage failure criterion for determining a complete failure of the brittle cohesive material is when a dimensionless effective separation satisfies one of the following: equality with the value 1.0, a power law, and a Benzeggagh-Kenane law (B-K law).

6. The method of claim 5, wherein the dimensionless effective separation is calculated as a square root of a sum of an actual separation of the three fracture modes divided by the square of the critical separation of the three fracture modes.

7. The method of claim 6, wherein said calculating, at said each of the solution cycles, the actual traction of said each of the three fracture modes further comprises determining whether the brittle cohesive material is under a loading, an unloading or a reloading phase by keeping track of a parameter storing a historical maximum effective separation at said each of the solution cycles.

8. The method of claim 7, wherein the actual traction of said each of the three fracture modes is calculated with the maximum traction, an actual displacement, the critical separation, the dimensionless effective separation and an associated normalized traction of said each of the three fracture modes of the brittle cohesive material under the loading phase.

9. The method of claim 7, wherein the actual traction of said each of the three fracture modes is calculated with a secant slope at the maximum effective separation, the actual displacement and the critical separation of said each of the three fracture modes of the brittle cohesive material under the unloading and the reloading phases.

10. The method of claim 9, wherein the secant slope is defined by a line between an original state of the brittle cohesive material and a state at the historical maximum effective separation.

11. The method of claim 5, wherein the dimensionless effective separation is calculated as a resultant a of actual displacement of said each of the three fracture modes.

12. The method of claim 11, wherein said calculating, at said each of the solution cycles, the actual traction of said each of the three fracture modes further comprises calculating an effective separation at the complete failure of the brittle cohesive material using the power law or the B-K law.

13. The method of claim 12, wherein the actual traction is calculated with the maximum traction, the actual separation, the critical separation, and a damage variable that includes the effective separation at a damage onset and the effective separation at the complete failure.

14. A computer program product including a computer usable medium having computer readable code embodied in the medium for causing an application module to execute on a computer for simulating fracture propagation in a brittle cohesive material, the computer program product comprising computer readable code for:
receiving, in a computing device with the application module for simulating fracture propagation in the brittle cohesive material installed thereon, three sets of a fracture energy release rate and an critical separation, each of the three sets corresponding to respective one of three fracture modes of the brittle cohesive material, wherein the three fracture modes comprises an opening mode, a sliding mode and a tearing mode, denoted by Mode-I, Mode-II and Mode-III, respectively;
defining a normalized traction-separation curve for the brittle cohesive material;
calculating three maximum tractions each for said respective one of the three fracture modes;
selecting a fracture damage failure criterion;
performing a time domain analysis of the fracture propagation in the brittle cohesive material, the time domain analysis comprising a plurality of solution cycles; and
calculating, at each of the solution cycles, an actual traction of said each of the three fracture modes based upon the fracture damage failure criterion chosen, wherein the actual traction is used for determining fracture propagation at said each of the solution cycles such that the fracture propagation can be graphically displayed to a monitor coupled to the computing device.

15. The computer program product of claim 14, wherein the fracture damage failure criterion for determining a complete failure of the brittle cohesive material is when a dimensionless effective separation satisfies one of the following: equality with the value 1.0, a power law, and a Benzeggagh-Kenane law (B-K law).

16. The computer program product of claim 15, wherein the dimensionless effective separation is calculated as a square root of a sum of an actual separations divided by the square of the critical separation of the three fracture modes.

17. The computer program product of claim 16, said computer readable code for said calculating, at said each of the solution cycles, the actual traction of said each of the three fracture modes further comprising determining whether the brittle cohesive material is under a loading, an unloading or a reloading phase by keeping track of a parameter storing a historical maximum effective separation at said each of the solution cycle.

18. The computer program product of claim 15, wherein the dimensionless effective separation is calculated as a resultant of the actual separation of said each of the three fracture modes.

19. A system for simulating fracture propagation in a brittle cohesive material, said system comprising:
an I/O interface;
a communication interface;
a secondary memory;
a main memory for storing a computer readable code for an application module;
at least one processor coupled to the main memory, the secondary memory, the I/O interface, and the communication interface, said at least one processor executing the computer readable code in the main memory to cause the application module to perform operations of:
receiving three sets of a fracture energy release rate and a critical separation, each of the three sets corresponding to respective one of three fracture modes of the brittle cohesive material, wherein the three fracture modes comprise an opening mode, a sliding mode and a tearing mode, denoted by Mode-I, Mode-II and Mode-III, respectively;
defining a normalized traction-separation curve for the brittle cohesive material;
calculating three maximum tractions each for said respective one of the three fracture modes;
selecting a fracture damage failure criterion;
performing a time domain analysis of the fracture propagation in the brittle cohesive material, the time domain analysis comprising a plurality of solution cycles; and
calculating, at each of the solution cycles, an actual traction of said each of the three fracture modes based upon the fracture damage failure criterion chosen, wherein the actual traction is used for determining fracture propagation at said each of the solution cycles such that the fracture propagation can be graphically displayed to a monitor coupled to the system.

20. The system of claim 19, wherein the fracture damage failure criterion for determining a complete failure of the brittle cohesive material is when a dimensionless effective separation satisfies one of the following: equality with the value 1.0, a power law, and a Benzeggagh-Kenane law (B-K law).

21. The system of claim 19, wherein the dimensionless effective separation is calculated as a resultant of the actual separation of said each of the three fracture modes.

* * * * *